United States Patent
Wille et al.

(10) Patent No.: US 6,743,876 B2
(45) Date of Patent: Jun. 1, 2004

(54) COPOLYMERS OF VINYLIDENE FLUORIDE AND HEXAFLUOROPROPYLENE HAVING REDUCED EXTRACTABLE CONTENT AND IMPROVED SOLUTION CLARITY

(75) Inventors: Roice Andrus Wille, Malvern, PA (US); Michael T. Burchill, Langhorne, PA (US)

(73) Assignee: Atofina Chemicals, Inc., Philadelphia, PA (US)

( * ) Notice: Subject to any disclaimer, the term of this patent is extended or adjusted under 35 U.S.C. 154(b) by 0 days.

(21) Appl. No.: 10/218,874

(22) Filed: Aug. 14, 2002

(65) Prior Publication Data

US 2003/0114614 A1 Jun. 19, 2003

Related U.S. Application Data

(62) Division of application No. 09/641,015, filed on Aug. 17, 1999, now abandoned.
(60) Provisional application No. 60/038,346, filed on Feb. 28, 1997.

(51) Int. Cl.[7] .............................................. C08F 214/22
(52) U.S. Cl. ...................... 526/255; 526/250; 526/253; 429/249; 429/252
(58) Field of Search ................ 526/250, 253, 526/255; 429/249, 252

(56) References Cited

U.S. PATENT DOCUMENTS 3,051,677 A * 8/1962 Rexford ...................... 522/156
5,093,427 A * 3/1992 Barber ........................ 525/276
5,418,091 A * 5/1995 Gozdz et al. ................ 429/252
5,456,000 A * 10/1995 Gozdz et al. ............... 29/623.2
6,218,051 B1 * 4/2001 Yokohata ..................... 429/249
6,322,923 B1 * 11/2001 Spotnitz et al. ............. 429/144

OTHER PUBLICATIONS

Piergiorgio Bonardelli and Giovanni Moggi, "Glass Tranisition Temperatures of Copolymer and Terpolymer Fluoroelastomers", Polymer, vol. 27, pp. 905–909, (1986).*
D.W. Van Krevelen, "Properties of Polymers", 1976 edition, Elsevier, see psges 122–124.*
Odian, Geroge G., "Principles of Polymerization", 1991 edition, Wiley. see pp. 19–24.*

* cited by examiner

Primary Examiner—David W. Wu
Assistant Examiner—Henry S Hu
(74) Attorney, Agent, or Firm—William D. Mitchell (57) ABSTRACT

New and novel copolymers of vinylidene fluoride and hexafluoropropylene containing up to 24% by weight hexafluoropropylene having lower DSC melting temperatures at 8 weight percent or greater nominal HFP content, and having improved solution clarity and fluidity, longer gel times and lower extractables than prior art vinylidene fluoride-hexafluoropropylene copolymers of comparable HFP content whose syntheses are disclosed in sufficient detail to duplicate, to novel compositions of matter and articles of manufacture containing such copolymers, processes for the preparation and use of the copolymers, of the compositions of matter containing such copolymers and of the articles of manufacture containing such copolymers are disclosed. Improved electrochemical cells based on the new and novel copolymers are particularly disclosed.

7 Claims, 5 Drawing Sheets

□ Present Invention   × Prior art polymers for which the prior art provides detailed synthetic methods.

COPOLYMERS OF VINYLIDENE FLUORIDE AND HEXAFLUOROPROPYLENE HAVING REDUCED EXTRACTABLE CONTENT AND IMPROVED SOLUTION CLARITY

This application is a divisional of application Ser. No. 09/641,015, filed Aug. 17, 2000 now abandoned, which application claims the benefit of provisional application serial No. 60/038,346 filed Feb. 28, 1997, now abandoned, application Ser. No. 09/031,015 filed Feb. 26, 1998 now abandoned, and application Ser. No. 09/136,570 filed Aug. 19, 1998.

BACKGROUND OF THE INVENTION

This invention relates to compositions of matter classified in the art of chemistry as fluoropolymers, more specifically as copolymers of vinylidene fluoride (VDF), more specifically as copolymers of vinylidene fluoride and hexafluoropropylene (HFP), still more specifically as copolymers of VDF and HFP having reduced extractable content, longer gel times and improved solution clarity relative to VDF, HFP copolymers known previously which otherwise have similar proportions of HFP in the bulk polymer, to novel compositions of matter and articles of manufacture containing such copolymers, as well as to processes for the preparation and use of the copolymers, of compositions of manufacture containing such copolymers and of the articles of manufacture containing such copolymers.

VDF/HFP copolymers are well known and are used for their thermoplastic engineering properties, chemical resistance and inertness toward degradation. They may be found in applications such as chemically resistant piping, gasketing, plenum cable jacketing, filtration and extraction membranes and in the construction of lithium batteries.

The present invention provides VDF/HFP copolymers containing up to about 24 weight % (12 mole %) HFP having among other improved properties, reduced melting point (at HFP weight percent content of 8% or greater) when determined by differential scanning calorimetry, substantially improved solution clarity, longer gel times and reduced extractables as these terms are defined hereinafter.

The process used to make the instant copolymers requires one ratio of VDF and HFP for the initial fill of the reactor, and a different ratio of VDF and HFP during a subsequent continuous feed of the monomers. Any particular desired average HFP content in the copolymer product has corresponding particular initial fill and subsequent feed ratios. The uniformity of compositions prepared this way provide unique and useful properties in comparison to all VDF/HFP copolymers previously known. These differences are not due to the presence or absence of foreign material impurities.

The present invention also provides lithium batteries fabricated from the VDF/HFP copolymers of the present invention which are uniquely suitable for lithium battery construction.

DISCLOSURE OF PRIOR ART

Rexford in U.S. Pat. No. 3,051,677 described VDF/HFP copolymers of HFP content 30 to 70 wt % (15 to 50 mol %) which showed utility as elastomers. To make the copolymers, a batch process with certain initial ratios of VDF and HFP, and also a continuous process with fixed ratios of VDF and HFP throughout the process were described. The polymers produced had HFP ratios higher than those contemplated by the present invention and they were made differently.

Lo in U.S. Pat. No. 3,178,399 described VDF/HFP copolymers of HFP content of 2 to 26 wt % (1 to 13 mol %) which showed a numerical value for the product of the tensile strength (psig) and percent reversible elongation of at least 1,000,000. A batch process with certain initial ratios of VDF and HFP, or, alternately, a semicontinuous process with fixed ratios of VDF and HFP throughout the process were used to make the copolymers. The processes discussed were such that copolymers made according to these processes have higher melting points and lack the improved solution clarity, longer gel times and low extractables of the present invention copolymers.

Barber in U.S. Pat. No. 5,093,427 describes a synthetic method and copolymer produced thereby which are the exact antithesis of the synthetic method and copolymers of the present invention. The synthesis in Barber is intended to and has been demonstrated to produce copolymers having significantly higher melting points as well as other polymer properties such as solution clarity, solution stability and extractable content markedly different from the polymers of this invention.

Moggi, et al. in Polymer Bulletin 7, 115–122 (1982) analyzed the microstructure and crystal structure of VDF/HFP copolymers by nuclear magnetic resonance and x-ray diffraction experiments. The copolymers of up to 31 wt % (up to 16 mol %) HFP were made in a batch emulsion process which was carried only to low conversion. While a low conversion batch process is theoretically capable of producing copolymers having lower melting points, solution clarity and low extractables, no such properties are described. It is not a practical process for industrial use because of the low conversions required to make the materials. In addition, since no detailed polymerization examples were offered, it is not possible to reproduce the polymers tested with any degree of certainty.

Bonardelli et al. in Polymer, vol. 27, 905–909 (June 1986) studied the glass transition temperatures of VDF/HFP copolymers having HFP content up to 62 wt. % (up to 41 mol %). The glass transition temperatures were correlated to the overall HFP content in the copolymers. In making the copolymers for analysis, a semicontinuous emulsion process was used which employed different VDF/HFP ratios for the initial fill of the reactor and for the subsequent continuous feed of monomers. Although reference was made to the use of reactivity ratios to set the VDF/HFP ratio for the initial fill, no detailed polymerization examples were offered, and no mention of copolymers having solution clarity, gel times (solution stability) and low extractables comparable to that of the copolymers of the present invention was made.

Pianca et al. in Polymer, vol. 28, 224–230 (February 1987) examined the microstructure of VDF/HFP copolymers by nuclear magnetic resonance, and the microstructure determinations were used to explain the trend in glass transition temperatures of the copolymers. The synthesis of the copolymers involved a semicontinuous emulsion process which used different VDF/HFP ratios for the initial fill of the reactor and for the subsequent continuous feed of monomers. No detailed synthesis examples were provided, and there was no discussion of copolymers having lowered melting points, improved solution clarity, longer gel times and low extractables as provided by the copolymers of the present invention.

Abusleme et al. in Eur. Pat. Appl. No. 650,982 A1 showed an emulsion process to make polymers and copolymers of fluorinated olefins optionally with one or more non-fluorinated olefins. The process relied on photochemical initiation of polymerization so that lower temperatures and pressures could be used than those used for thermally initiated processes. While there was general mention of the structural regularity of the resulting polymers, the only evidence of regularity concerned poly(vinylidene fluoride) homopolymer, and no claims were made as to regularity of composition. Examples of VDF/HFP copolymerization were given, but no discussion of the melting points and/or of the solution extraction properties of the copolymers was given, and there was no relation made between physical properties and the structure of the VDF/HFP copolymers.

Morgan in U.S. Pat. No. 5,543,217 disclosed uniform tetrafluoroethylene/hexafluoropropylene copolymers (TFE/HFP copolymers) made by a semicontinuous emulsion process. Uniformity was simply defined as there being a low proportion of adjacent HFP units in the polymer chains; there was no disclosure of the disposition of TFE and HFP units otherwise, and there was no discussion of VDF/HFP copolymers or the properties to be expected therefrom.

U.S. Pat. No. 2,752,331 describes the synthesis of VDF/chlorotrifluoroethylene (CTFE) copolymers having a high uniformity of comonomer distribution in its molecular chains.

Baggett and Smith in High Polymers, Vol. XVIII, Ham, John Wiley (1964), Chapter X, Copolymerization, pp. 587 et seq., particularly at pp. 593 and 610 describe the sythesis of uniform composition distribution copolymers of vinylidene chloride and vinyl chloride and of vinyl chloride and vinyl acetate.

None of these references teaches or suggests a way to obtain VDF/HFP copolymers having lower melting temperatures (when the copolymer has greater than 8 wt. % HFP content), solvent solution clarity and fluidity, longer gel times and low extractables when compared to the previously known VDF/HFP copolymers described by such references all of which have comparable freedom from extraneous impurities.

U.S. Pat. No. 4,076,929 describes the synthesis of VDF homopolymer having a uniformly distributed relatively high defect structure in its molecular chains.

U.S. Pat. No. 5,296,318 teaches that only VDF/HFP copolymers having 8 to 25% by weight HFP and no other VDF homo- or copolymers are suitable for use in fabrication of lithium battery electrodes and separators.

U.S. Pat. No. 5,348,818 mentions that among other polymers, VDF polymer may be used in forming a solid electrolyte for use in secondary battery manufacture. No particular type of polyvinylidene fluoride is identified and no copolymers thereof of any type are suggested.

European Patent Application 95 120 660.6-1215 published Sep. 4, 1996, corresponding to U.S. Pat. No. 5,922,493, teaches use of micro porous (open or closed cell) VDF copolymers of about 7% to about 25% comonomer content in lithium batteries and the use of VDF homopolymer as a cladding material for such batteries. Use of copolymers used by the instant invention in solid electrolytes and the improved properties provided thereby are not taught or suggested. Similarly the use of the type of VDF homopolymer used in the present invention in solid electrolytes is not taught of suggested.

None of these references teach or suggest lithium rocking chair batteries of the type contemplated by the present invention and U.S. Pat. No. 5,296,318 expressly teaches away from use of VDF homopolymer of any type, VDF/HFP copolymers of less than 8% by weight HFP content or other VDF containing copolymers.

U.S. Pat. No. 5,571,634 teaches a lithium ion battery construction employing a VDF-CTFE copolymer where the CTFE content in the copolymer is no less than 8% by weight.

SUMMARY OF THE INVENTION

The invention provides in a first composition aspect a copolymer of vinylidene fluoride and hexafluoropropylene containing a maximum of about 24 weight percent hexafluoropropylene, having a uniform distribution of hexafluoropropylene residues between chains, such uniformity being demonstrated by the copolymers having solutions of improved clarity and fluidity, such uniformity additionally being demonstrated by:

i) for the copolymers having up to about 8 weight percent nominal HFP content, having weight percent extractables within plus or minus 1.5% of the percent by weight extractables calculated by an equation selected from the group consisting of:
  a) Wt. % Extractable=1.7(HFP mole %)−3.2, and
  b) Wt. % Extractable=−1.2+1.5(HFP mole %)−8×10$^{-6}$ (Mn) when HFP content is determined by Method A described below, where Mn is number-average molecular weight, and ii for the copolymers having 8 weight percent nominal HFP content and greater, having a DSC (differential scanning calorimetry) melting point at least 2.5° C. lower than the DSC melting point of copolymers having the same nominal weight percent HFP prepared by processes reported in the prior art when the HFP content is determined by Method A described below and having DSC melting points which fall on or below a value determined by the equation:

$$DSC \text{ melting point in deg. } C=166.7-2.9(HFP \text{ wt } \%),$$

when the HFP content is determined by Method B described below.

The tangible embodiments of this first composition aspect of the invention are straw colored to colorless semi crystalline solids having melting points, as determined by differential scanning calorimetry (DSC), lower than VDF/HFP copolymers having the same nominal HFP percentage content prepared by processes reported in detail in the prior art.

The tangible embodiments of this first composition aspect of the invention also possess longer gelation times from solution as well as greater clarity and fluidity of solutions containing them than VDF/HFP copolymers having the same nominal HFP content prepared by processes reported in detail in the prior art.

The processes reported in detail in the prior art are those identified in the prior art section hereinabove which are stated to provide sufficient information for accurate reproduction of their experimental methods. Specifically, they are U.S. Pat. No. 3,178,399 and U.S. Pat. No. 5,093,427 all of which are concerned with VDF, HDF copolymers. The DSC of the copolymers produced by the methods of these references containing HFP content of 8 weight percent or greater up to about 24 weight percent fall above the value determined by the DSC melting point equation stated above.

The aforementioned physical characteristics taken together with the method of synthesis positively tend to confirm the structure and the novelty of the compositions sought to be patented.

The tangible embodiments of the first composition aspect of the invention have the inherent applied use characteristics of being suitable for paint and powder coating vehicles and as chemically resistant shaped objects and films both supported and unsupported. Particular mention is made of copolymers of the first composition aspect of the present invention having from about 2 weight % HFP content to 8 weight % HFP, more particularly copolymers having about 3 to 7 weight % HFP, still more particularly those having 3 to 6 wt % HFP which possess the inherent applied use characteristics of being particularly suitable as polymeric separators and polymeric electrode matrices for batteries, particularly lithium batteries.

The prior art, see for example U.S. Pat. No. 5,296,318, has reported lithium batteries made from VDF/HFP copolymers having from 8% to 25% by weight HFP. It is understood that the copolymers of the present invention having HFP content in that range are also suitable for use in such batteries and would represent an improvement therein. Such improved batteries are also contemplated by the invention as equivalents.

Particular mention is also made of copolymers of the first composition aspect of the invention having from about 7 weight percent HFP content to about 15 weight percent HFP content, more particularly copolymers having about 10 weight percent HFP content which possess the inherent applied use characteristic of being suitable as flame resistant insulation for wire and cable.

Still further mention is made of copolymers of the first composition aspect of the invention having greater than about 15 weight percent HFP content, still more particularly of copolymers having about 16% by weight or greater HFP content which have the inherent applied use characteristic as clear, flexible, chemically resistant films.

The invention provides in a second composition of matter aspect, an improved article of manufacture comprising an electrochemical cell having a positive electrode, an absorber separator and a negative electrode wherein at least either one of the electrodes comprises a vinylidene fluoride polymer having an electrolyte material combined therewith and/or said absorber separator comprises a vinylidene fluoride polymer having an electrolyte material combined therewith wherein the improvement comprises the polyvinylidene fluoride polymer consisting essentially of a vinylidene fluoride/hexafluoropropylene copolymer as defined in the first composition aspect of the invention.

Special mention is made of embodiments of the second composition of the invention wherein the VDF/HFP copolymer has a hexafluoropropylene content of from about 2 wt % up to 8 wt % hexafluoropropylene, particularly those having from 3 weight % to 7 weight % hexafluoropropylene, still more particularly, those having about 3 weight % to 6 wt % hexafluoropropylene.

As used herein and in the appended claims, vinylidene fluoride polymers (or VDF polymers) of the present invention means the VDF/HFP copolymers which are the first composition aspect of the invention.

The electrochemical cells of the type of which the second composition of matter aspect of this invention is an improvement are described in PCT Application WO 95/06332, European Patent Application 95 120 660.6-1215, published as number 730,316 A1 on Sep. 4, 1996 and U.S. Pat. No. 5,296,318. The disclosures of the PCT application, the European application and the U.S. patent are hereby incorporated by reference.

In addition to use of solution casting techniques for preparation of films for use in battery constructions as described in the aforementioned references, use of extrusion techniques to prepare such films and the batteries fabricated therefrom are also contemplated.

It has also been noted that batteries fabricated from the above described VDF polymers, particularly the VDF-HFP copolymers of the present invention have better adhesion of the polymers to metallic portions of electrodes and higher use temperatures than batteries fabricated from VDF-HFP copolymers of the prior art. It has also been observed that VDF-HFP copolymers of the present invention provide batteries having improved electrical properties including the capability of higher discharge rates than batteries fabricated from VDF-HFP copolymers of the prior art. It is expected by the present inventors that in general batteries fabricated according to the present invention will possess such higher temperature use and higher discharge rate capabilities.

The invention provides in a third composition aspect, a solution of a composition of the first composition aspect of the invention having improved solution clarity and fluidity.

Copolymers of vinylidene fluoride and hexafluoropropylene of up to about 24 wt % hexafluoropropylene are useful semicrystalline thermoplastics. As the HFP content increases in the materials, the crystallinity decreases, and, correspondingly, the flexibility and solvent sensitivity increase. Other properties change as well, such as the final melting point, which decreases with increasing HFP content. In high-purity applications such as membrane filtration or extraction, lithium battery construction, high-transparency film from solution casting, and fluid storage and transport requiring low contaminant levels, it is desirable to have materials with low levels of extractables, little gel formation in the presence of solvent, and good clarity. The VDF/HFP copolymers provided here show lower extractables, improved solution properties, improved clarity and fluidity, and lower melting points in comparison to the nonuniform VDF/HFP copolymers of otherwise similar HFP content whose manufacture is enabled in the prior art.

By uniform it is meant that there is decreased chain to chain variation in the distribution of HFP residues in polymer chains in comparison to the nonuniform copolymers of the prior art where the HFP content from chain to chain varies broadly, thereby imparting measurably different inherent physical and chemical properties.

DETAILED DESCRIPTION

The invention provides copolymers of vinylidene fluoride and hexafluoropropylene having hexafluoropropylene content of up to about 24 wt % which have a uniform HFP residue content between polymer chains in the bulk polymer and, thus, have improved solution clarity and fluidity and reduced extractables. The copolymers are conveniently made by an emulsion polymerization process, but suspension and solution processes may also be used. In an emulsion polymerization process a reactor is charged with deionized water, water-soluble surfactant capable of emulsifying the reaction mass during polymerization, paraffin antifoulant, vinylidene fluoride, hexafluoropropylene, chain-transfer agent to control copolymer molecular weight, and initiator to start and maintain the polymerization. To obtain the VDF/HFP copolymers of the present invention, the initial charge of VDF and HFP monomers is such that the amount of HFP is up to 48% of the combined weight of the monomers initially charged, and then VDF and HFP are fed continuously throughout the reaction such that the amount of the HFP is up to 24% of the combined weight of the monomers fed continuously. The VDF/HFP ratios are different in the initial charge and during the continuous feed, and each final polymer composition has definite and related ratios for the initial charge and continuous feed. The process uses total amounts of VDF and HFP monomers such that the amount of HFP used is up to about 24% of the combined total weight of the monomers.

The reactor is a pressurized polymerization reactor equipped with a stirrer and heat control means. The temperature of the polymerization can vary depending on the characteristics of the initiator used, but it is typically between 65° and 105° C., and most conveniently it is between 75° and 95° C. The temperature is not limited to this range, however, and might be higher or lower if a high-temperature or low-temperature initiator is used. The VDF/HFP ratios used in the polymerization will be dependent on the temperature chosen for reaction. The pressure of the polymerization is typically between 2750 and 6900 kPa, but it can be higher if the equipment permits operation at higher pressure. The pressure is most conveniently between 3790 and 5860 kPa.

Surfactants used in the polymerization are water-soluble, halogenated surfactants, especially fluorinated surfactants such as the ammonium, substituted ammonium, quaternary ammonium, or alkali metal salts of perfluorinated or partially fluorinated alkyl carboxylates, the perfluorinated or partially fluorinated monoalkyl phosphate esters, the perfluorinated or partially fluorinated alkyl ether or polyether carboxylates, the perfluorinated or partially fluorinated alkyl sulfonates, and the perfluorinated or partially fluorinated alkyl sulfates. Some specific, but not limiting examples are the salts of the acids described in U.S. Pat. No. 2,559,752 of the formula $X(CF_2)_nCOOM$, wherein X is hydrogen or fluorine, M is an alkali metal, ammonium, substituted ammonium (e.g., alkylamine of 1 to 4 carbon atoms), or quaternary ammonium ion, and n is an integer from 6 to 20; sulfuric acid esters of polyfluoroalkanols of the formula $X(CF_2)_nCH_2OSO_3M$, where X and M are as above; and salts of the acids of the formula $CF_3(CF_2)_n(CX_2)_mS_3M$, where X and M are as above, n is an integer from 3 to 7, and m is an integer from 0 to 2, such as in potassium perfluorooctyl sulfonate. The use of a microemulsion of perfluorinated polyether carboxylate in combination with neutral perfluoropolyether in vinylidene fluoride polymerization can be found in EP0816397AI. The surfactant charge is from 0.05% to 2% by weight on the total monomer weight used, and most preferably the surfactant charge is from 0.1% to 0.2% by weight.

The paraffin antifoulant is conventional, and any long-chain, saturated, hydrocarbon wax or oil may be used. Reactor loadings of the paraffin are from 0.01% to 0.3% by weight on the total monomer weight used.

After the reactor has been charged with deionized water, surfactant, and paraffin antifoulant, the reactor is either purged with nitrogen or evacuated to remove oxygen. The reactor is brought to temperature, and chain-transfer agent may optionally be added. The reactor is then pressurized with a mixture of vinylidene fluoride and hexafluoropropylene.

Chain-transfer agents which may be used are well-known in the polymerization of fluorinated monomers. Alcohols, carbonates, ketones, esters, and ethers are oxygenated compounds which serve as chain-transfer agents. Specific, but not limiting examples, are isopropyl alcohol, such as described in U.S. Pat. No. 4,360,652, acetone, such as described in U.S. Pat. No. 3,857,827, and ethyl acetate, as described in the Published Unexamined Application (Kokai) JP 58065711. Other classes of compounds which serve as chain-transfer agents in the polymerization of fluorinated monomers are halocarbons and hydrohalocarbons such as chlorocarbons, hydrochlorocarbons, chlorofluorocarbons, and hydrochlorofluoro-carbons; specific, but not limiting examples are trichlorofluoromethane, such as described in U.S. Pat. No. 4,569,978, and 1,1-dichloro-2,2,2-trifluoroethane. Chain-transfer agents may be added all at once at the beginning of the reaction, in portions throughout the reaction, or continuously as the reaction progresses. The amount of chain-transfer agent and mode of addition which is used depends on the activity of the agent and the desired molecular weight characteristics of the product. The amount of chain-transfer agent used is from 0.05% to 5% by weight on the total monomer weight used, and preferably it is from 0.1 to 2% by weight.

The reactor is pressurized by adding vinylidene fluoride and hexafluoropropylene monomers in a definite ratio (first effective ratio) such that the hexafluoropropylene ranges up to 48% of the combined weight of the monomers initially charged. The first effective ratio used will depend on the relative reactivity of the two monomers at the polymerization temperature chosen. The reactivity of vinylidene fluoride and hexafluoropropylene has been reported in Bonardelli et al., Polymer, vol. 27, 905–909 (June 1986). The relative reactivity is such that to obtain a particular uniform copolymer composition, more hexafluoropropylene has to be charged to the reactor in the initial fill than will be incorporated into the copolymer. At the convenient polymerization temperature range of this invention, about twice as much hexafluoropropylene has to be charged to the reactor in the initial fill as will appear in the polymer.

The reaction can be started and maintained by the addition of any suitable initiator known for the polymerization of fluorinated monomers including inorganic peroxides, "redox" combinations of oxidizing and reducing agents, and organic peroxides. Examples of typical inorganic peroxides are the ammonium or alkali metal salts of persulfates, which have useful activity in the 65° C. to 105° C. temperature range.

"Redox" systems can operate at even lower temperatures and examples include combinations of oxidants such as hydrogen peroxide, t-butyl hydroperoxide, cumene hydroperoxide, or persulfate, and reductants such as reduced metal salts, iron (II) salts being a particular example, optionally combined with activators such as sodium formaldehyde sulfoxylate or ascorbic acid. Among the organic peroxides which can be used for the polymerization are the classes of dialkyl peroxides, peroxyesters, and peroxydicarbonates. Exemplary of dialkyl peroxides is di-t-butyl peroxide, of peroxyesters are t-butyl peroxypivalate and t-amyl peroxypivalate, and of peroxydicarbonates are di(n-propyl) peroxydicarbonate, diisopropyl peroxydicarbonate, di(sec-butyl) peroxydicarbonate, and di(2-ethylhexyl) peroxydicarbonate. The use of diisopropyl peroxydicarbonate for vinylidene fluoride polymerization and copolymerization with other fluorinated monomers is taught in U.S. Pat. No. 3,475,396, and its use in making vinylidene fluoride/hexafluoropropylene copolymers is further illustrated in U.S. Pat. No. 4,360,652. The use of di(n-propyl) peroxydicarbonate in vinylidene fluoride polymerizations is described in the Published Unexamined Application (Kokai) JP 58065711. The quantity of an initiator required for a polymerization is related to its activity and the temperature used for the polymerization. The total amount of initiator used is generally between 0.05% to 2.5% by weight on the total monomer weight used. Typically, sufficient initiator is added at the beginning to start the reaction and then additional initiator may be optionally added to maintain the polymerization at a convenient rate. The initiator may be added in pure form, in solution, in suspension, or in emulsion, depending upon the initiator chosen. As a particular example, peroxydicarbonates are conveniently added in the form of an aqueous emulsion.

As the reaction progresses, a mixture of vinylidene fluoride and hexafluoropropylene monomers is fed in a definite ratio (second effective ratio) so as to maintain reaction pressure. The second effective ratio used corresponds to the monomer unit ratio desired in the final composition of the copolymer, and it can range up to 24% of the combined weight of the monomers being fed continuously throughout the reaction. The feed of vinylidene fluoride, hexafluoropropylene, and optionally initiator and chain-transfer agent is continued until the desired reactor fill is obtained.

Upon reaching the desired reactor fill, the monomer feeds are terminated. To achieve the copolymer having optimum solution clarity and minimal extractables, all other feeds are stopped at the same time as the monomer feeds, and the reactor is vented as soon as is practicable. Alternatively, to achieve highest yield at the expense of solution clarity and extractables, a react-out period to consume residual monomer is used with optional continuation of initiator feed. For react-out, the reaction temperature and agitation are maintained for a period of 20 to 30 minutes, but a longer period can be used if required in order to consume monomer to the point where the reactor pressure is no longer falling to any significant degree. A settling period of typically 10 to 40 minutes may be used following the react-out period. During the settling period, temperature is maintained but no initiator feed is used. The reactor is then cooled and vented.

The product is recovered as a latex. To obtain dry resin, the latex is coagulated, the coagulum is separated and the separated coagulum may be washed. To provide powder, the coagulum is dried.

For the coagulation step, several well-known methods can be used including freezing, the addition of acids or salts, or mechanical shear with optional heating. The powder, if desired, can be further processed into pellets or other convenient resin forms.

The electrochemical cells of the present invention are based on a positive electrode, an absorber-separator sometimes referred as a solid electrolyte and negative electrode operatively associated with one another wherein at least one of the electrodes or the absorber-separator, and preferably both electrodes and the absorber-separator comprise a vinylidene fluoride polymer of the present invention and wherein the vinylidene fluoride polymer of the present invention electrodes have an electrode material combined therewith and the vinylidene fluoride polymer of the present invention absorber-separator has an electrolyte material combined therewith. A plurality of electrodes and absorber-separator elements can be used in the cell structure in order to increase the voltage, and/or amperage of the combined elements in a manner well known to the art.

Vinylidene fluoride polymer of the present invention is not required to have an open or closed porous structure for operability. It provides enhanced electrolyte mobility in combination with the intrinsic ionic conductivity effects of the polymer regardless of its initial porous or non porous state. Vinylidene fluoride electrode or separator-absorber combined with electrode or electrolyte materials at the surface of the pores of the porous polymer was previously believed to make the utilization of the active material, whether electrode material or electrolyte material more efficient and provide a method for the easy manufacture of the efficient electrodes and separator-absorber structures. There are, however, other advantages to use of porous polymer structures even for the polyvinylidene fluoride polymers of the present invention.

It is also believed that the segregation of the active materials on the surface of active pores will allow for varying the amount of binder in the electrode of the separator-absorber to enhance strength with minimum effect on cell performance. The electrochemical cells formed in this way therefore will have improved mechanical properties and can be made to be self-supporting i.e., secondary reinforcing structures do not have to be employed such as a metal or other conventional battery casing material.

This also leads to ease of fabrication where the electrochemical cell is enveloped or enclosed in a vinylidene fluoride homopolymer which will adhere to the porous electrodes and/or the absorber-separator structures. Adhesion can be obtained by simple heat bonding or radio frequency (rf) welding or other similar processes well known in the art. Adhesives are not required, but importantly, the exterior part of the electrochemical cell (i.e., the envelope) is of the same type or a substantially similar type of material as the electrodes and absorber-separator and is more compatible therewith and adherent thereto, thereby simplifying and reducing the cost of manufacture in that only one type of material is used for the structural components of the cell as compared to either conventional dry cell or secondary cell construction.

Polyvinylidene fluoride in general absorbs rf frequency and may also be heated by dielectric techniques. Heat guns may also be used for sealing polyvinylidene fluoride surfaces under pressure. Welding rods may also be employed to heat seal two pieces easily as is done in the fabrication of larger polyvinylidene fluoride structures. The joints obtained are usually as strong as the basic resins employed. Because polyvinylidene fluoride polymers are abrasion resistant and tough as well as chemical resistant, they are useful in the internal and external element of the battery and, as noted previously, can be assembled by non-adhesive means by heat bonding.

By selecting vinylidene fluoride polymers of the present invention for electrodes and such polymers or conventional VDF polymer for cladding that are either extremely flexible or somewhat rigid, structures can be fabricated that are in turn either flexible or somewhat rigid. Further in this regard, enhanced rigidity can be obtained by cross-linking the vinylidene fluoride homo- or copolymers in general either chemically, but preferably by employing high energy radiation such as high energy (about 10 to about 20 Mrad) electron beam radiation, with some attendant dehydrofluorination. One potential benefit is the further stabilization of the amorphous regions in the vinylidene fluoride polymers, i.e., inhibitions of crystallization over time which is important since ionic conductivity of the electrolyte is believed to occur primarily in the amorphous or open regions.

As noted previously, vinylidene fluoride polymers in general affect ionic conductivity in a manner that makes them suitable for the fabrication of electrochemical cells.

Since mobility of charged species is required in electrochemical cells, it is believed that the migration of charged species in polyvinylidene fluoride polymers will be through the amorphous phase. The vinylidene fluoride polymers of the present invention have been recognized by the invention as having enhanced amorphous phases which are more stable and particularly for the HFP and CTFE copolymers provide this benefit to conductivity and the like at lower comonomer levels, thus, providing solubility and temperature advantages approaching that of homopolymers.

In the triboelectric series, most polymers stabilize electrons. Vinylidene fluoride polymers, however, are unique in stabilizing positive holes and are one of the most effective media in this regard, presumably due to the highly negative gem-difluorocarbon group.

In the special case of lithium ion batteries such as the rocking-chair batteries described herein, the high specific charge and small ionic size of the lithium ion may lead to specific interactions in the host vinylidene fluoride polymer environment, considering the extent of the non-polarizable, negative gem-difluorocarbon groups available.

Since conductivity is inversely related to crystallinity of the polyvinylidene fluoride polymer, it has been determined that conventional copolymers of vinylidene fluoride with about 7 to about 25% hexafluoropropylene sufficiently reduce the crystalline structure of the polymer without sacrificing mechanical properties so that acceptable ionic conductivity effects of the polymer can be obtained. The inventors have discovered that the vinylidene fluoride polymers of the present invention provide benefits equal to or better than the above conventional VDF/HFP copolymers at comonomer levels below 8%-by weight, preferably below 7% by weight more preferably below 6% by weight.

When employing vinylidene fluoride polymers of the present invention in the manufacture of electrodes or absorber-separators, plasticizers such as organic carbonates (e.g., ethylene carbonate, propylene carbonate, dimethyl carbonate and the like) are utilized in order to minimize the effect of the crystalline structure and promote ionic conductivity. Other solvents or plasticizers may also be employed including diethoxyethane, diethyl carbonate, dimethoxyethane, dipropyl carbonate and mixtures thereof especially the two or three component mixtures.

Similarly, and in accord with the present invention, the various porous or non-porous structures, depending on the their tensile strength, can be mechanically oriented by stretching or the application of tensile forces in order to enhance the amount of beta conformation within the polymer structure and thereby possibly promote ionic conductivity depending upon the electrolyte and polyvinylidene fluoride composition.

Using solvent and non-solvent combinations, polyvinylidene fluoride polymers of the present invention are cast in thin membranes. This method is described by Benzinger et al. in U.S. Pat. No. 4,384,047 which is incorporated herein by reference. The electrode materials or the electrolyte materials as described herein can be incorporated into polyvinylidene fluoride solution prior to casting it into a film or sheet, after which the solution may, if desired, be converted to a porous polyvinylidene fluoride membrane combined with the electrode of electrolyte materials. These films or sheets, either with or without the electrode or electrolyte materials can be any where from about 0.25 to about 100, particularly from about 0.5 to about 10, and especially from about 1 to about 8 mils thick, and are especially suitable for further treatment by stretching or the application of tensile forces in order to promote the beta conformation necessary to achieve ferroelectric properties in polyvinylidene fluoride.

There are three classes of organic liquids, that may be used to make solutions or dispersions of vinylidene fluoride polymers. Active solvents are those organic liquids that dissolve or swell vinylidene fluoride polymers at room temperature and typically consist of lower alkyl ketones, esters and amides. Latent solvents are those organic liquids that do not dissolve vinylidene fluoride homo- or copolymers at room temperature; however, will dissolve polyvinylidene fluoride at elevated temperatures and typically are medium chain length alkyl ketones, esters, glycol ethers and organic carbonates. Non-solvents are organic liquids that do not dissolve or swell vinylidene fluoride polymers up to the boiling point of the liquid or the crystalline melting point of the vinylidene fluoride polymer, whichever condition is met first. These liquids typically are aromatic hydrocarbons, aliphatic hydro-carbons and chlorinated hydrocarbons or other chlorinated organic liquids. The solvents and latent solvents are used in the manufacture of the polyvinylidene fluoride films or sheets of the present invention.

Examples of these organic liquids are given in Table A which follows.

TABLE A

LIQUIDS TO PREPARE SOLUTIONS OR DISPERSIONS OF PVDF

| ACTIVE SOLVENTS | LATENT SOLVENTS (APPROX.) DIS-SOLUTION TEMP-ERATURE IN ° C. | NON SOLVENTS |
|---|---|---|
| Acetone | Butyrolactone (65) | Hexane |
| Tetrahydrofuran | Isophorone (75) | Pentane |
| Methyl Ethyl Ketone | Methyl Isoamyl Ketone (102) | Benzene |
| Dimethyl Formamide | Cyclohexanone (70) | Toluene |
| Dimethyl Acetamide | Dimethyl Phthalate (110) | Methanol |
| Tetramethyl Urea | Propylene Glycol Methyl Ether (115) | Ethanol |
| Dimethyl Sulfoxide | Propylene Carbonate (80) | Carbon Tetrachloride |

TABLE A-continued

LIQUIDS TO PREPARE SOLUTIONS OR DISPERSIONS OF PVDF

| ACTIVE SOLVENTS | LATENT SOLVENTS (APPROX.) DISSOLUTION TEMPERATURE IN ° C. | NON SOLVENTS |
|---|---|---|
| Trimethyl Phosphate | Diacetone Alcohol (100) | o-Dichlorobenzene |
| N-Methyl Pyrrolidone | Glycerol Tricetate (100) | Trichloroethylene |

The suitability of any given liquid depends upon the exact PVDF resin type and grade.

Other methods have been developed for the manufacture, when desired, of open cell foam porous polyvinylidene fluoride polymers which are formulated to contain chemical or physical blowing agents such as absorbed carbon dioxide. It is preferred to use physical blowing agents in the manufacture of electrochemical cells since trace amounts of the chemical blowing agents in the foam structure could adversely affect the functioning of the cell. Where carbon dioxide or comparable physical blowing agents are employed, they are incorporated into the polyvinylidene fluoride at super critical pressures followed by heat treatment to expand the article thus produced. Open cell films of varying thickness have been made in this manner with excellent mechanical integrity and which have specific gravities about one as compared to solid polyvinylidene fluoride which has a specific gravity of from about 1.76 about 1.78.

Similarly, polyvinylidene fluoride powders can be sintered to form a porous structure by heating the powders in a non-solvent slurry, or under pressure between opposed platens, until the individual particles sufficiently melt flow into one another to form the desired open cell structure. Other art known methods for sintering powder polymers such as PTFE for forming open cell porous structures as described by Menassen et al. "*A Polymer Chemist's View on Fuel Cell Electrodes,*" *Proceeding of the 34th International Power Source Symposium*, Jun. 25–28, 1990, pp. 408–10 can also be used.

A porous film made by casting polyvinylidene provide polymers of the present invention from a mixture of solvents and non-solvents as described by Benzinger et al. in U.S. Pat. No. 4,383,047, which is about 10 mils thick after formation from the casting solution, may be utilized for the manufacture of an electrochemical cell. The polymer comprises a copolymer of Example 1 herein below. This film is used in fabricating an absorber-separator of solid electrolyte by making a solution of $LiPF_6$ in 1:1 mixture by weight of ethylene carbonate:propylene carbonate which is heated to about 125° C. and the porous copolymer film immersed in the solution until it is combined with the film.

Similarly, a positive electrode is made from the same porous copolymer. A dispersion of $LiMn_2O_4$, SS carbon black and $LiPF_6$ in a 1:1 mixture of ethylene carbonate and propylene carbonate along with tetrahydrofuran (THF) was combined with the porous film by soaking the film in the suspension which is agitated in a vibrating beaker in order to keep solid material in suspension until adequately combined with the film. The film is then placed on an aluminum foil.

A negative electrode is prepared by making a dispersion or suspension of petroleum coke, SS carbon black and $LiPF_6$ in a 1:1 ethylene carbonate:propylene carbonate solution in the same manner as was done for the preparation of the positive electrode and after combining the suspension with the porous film, a copper foil was placed on the film.

The proportions of the various components of the electrode and the absorber-separator or solid electrolyte are substantially the same as those set forth in Examples 1 and 8 of Gozdz et al., U.S. Pat. No. 5,296,318.

The electrodes and electrolyte can also be made from sintered polyvinylidene fluoride by forming a dry blend of the electrode or electrolyte materials with powdered polyvinylidene fluoride. Dry mixing techniques, known in the art may be employed, such as tumbler type mixing. For example, the mixture of polyvinylidene fluoride powder and the electrode or electrolyte materials can be subjected to tumbling or ball milling for a time to sufficiently ensure that a good mixture is obtained. A steel or other metal vessel, or ceramic vessel is employed, especially where either is lined with a polyvinylidene fluoride or PTFE layer. In the case of ball milling, steel or other metal, or ceramic grinding balls, also coated with a polyvinylidene fluoride or PTFE layer are used. The polyvinylidene fluoride or PTFE coating is employed to substantially minimize or substantially eliminate the introduction of impurities into the system. The milled mixtures are formed into electrodes and electrolytes by the application of heat and pressure as noted herein.

One of skill in the art will recognize that non-porous VDF/HFP copolymer of the 1st composition aspect of the invention or other vinylidene fluoride polymers of the invention, porous or non-porous may be substituted for the described VDF/HFP of Example 1 to make analogous batteries.

Solvents such as ethylene carbonate and propylene carbonate, and their equivalents, especially as noted herein, including mixtures thereof, which are employed in the electrode or electrolyte can be added afterwards by soaking the electrodes and electrolyte structures in such solvents. The soaking can be carried out at room temperature or above to maximize the solvating effect of these materials and to produce optimum ionic conductivity n the electrodes or electrolyte.

Figure 4:
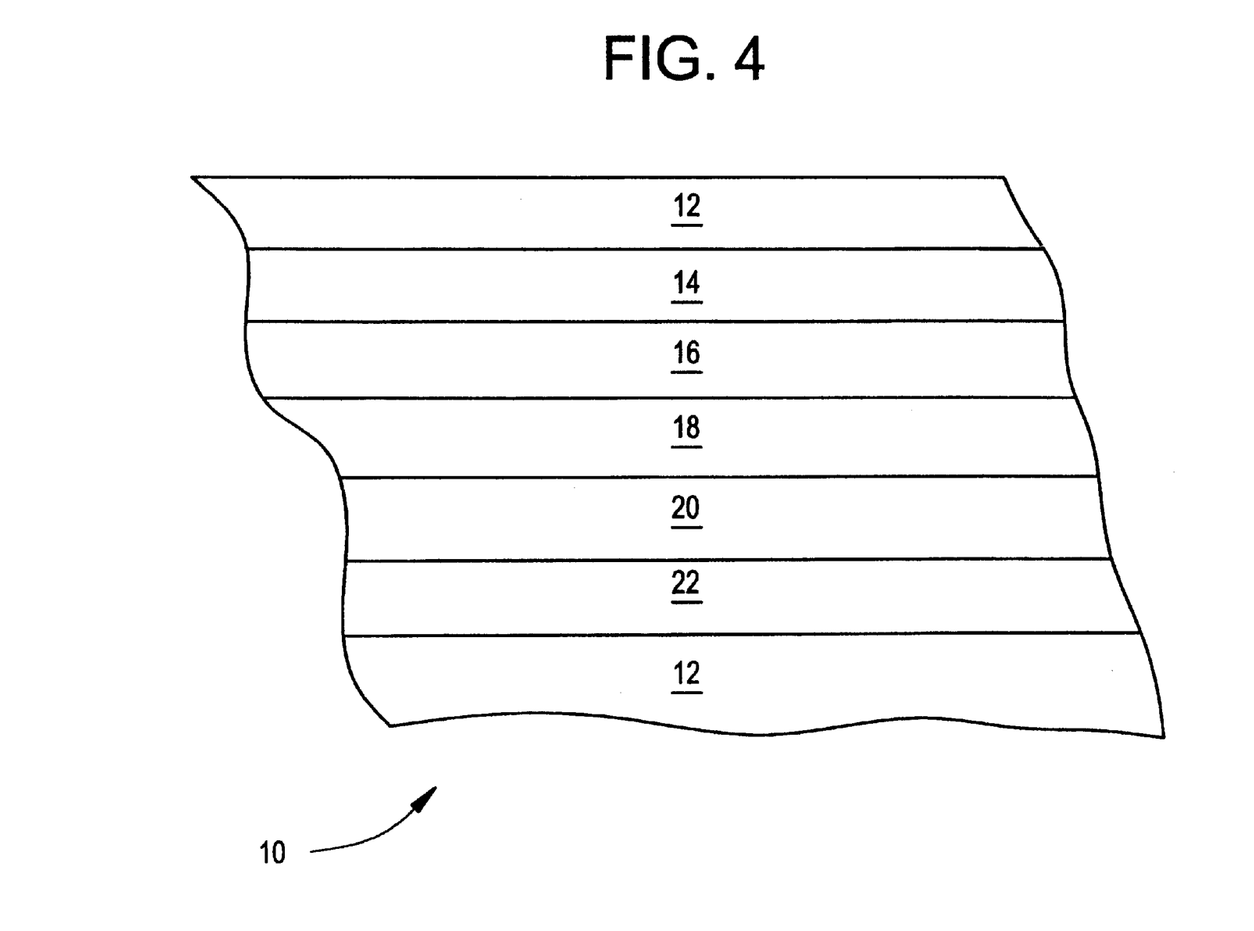
FIG. 4 is a cross section of an electrochemical cell in accord with the present invention, representing an envelope of polyvinylidene fluoride homopolymer which extends completely around the cell, 14 is copper film shown extending along one surface of negative electrode 16 which is operatively associated with absorber-separator 18, and 22 is aluminum film in contact with positive electrode 20 which is in turn in contact with the other face of absorber-separator 18.

The positive electrode and the negative electrode thus prepared, are then placed on opposite sides of the absorber-separator prepared as described above with the copper and aluminum surfaces facing outwardly to form a cell as illustrated in FIG. 4 in which copper film 14 is shown as extending along one surface of negative electrode 16 which is operatively associated with absorber-separator 18 combined with the electrolyte. aluminum film 22 is in contact with positive electrode 20 which is in turn in contact with the other face of absorber-separator 18, all of the elements being operatively associated with one another. An envelope 12 of polyvinylidene fluoride homopolymer extends completely around the cell. Envelope 12 may be a single film or a plurality of films e.g., two or three films and extends around all sides and completely envelops cell 10. Copper and aluminum leads (not shown) are passed through envelope 10 to make electrical contact with films 14 and 22, respectively and are connected to a load (not shown) to form an electric circuit.

The other electrolytes described herein for the rocking-chair cells may also be employed in lieu of the $LiPF_6$ salt and $LiNiO_2$ or $LiCoO_2$ materials substituted for the $LiMn_2O_4$ materials in the forgoing example. Additionally, graphite rather than petroleum coke may be employed in the manufacture of the negative electrode although, petroleum coke is especially preferred.

The vinylidene fluoride polymers of the present invention may also be employed in cells having a lithium organic electrolyte where the polymer is used either as a binder for particular electrode active materials, as a solid electrolyte for polymeric cells, a porous mesh supporting a quasi-solid state gel electrolyte and as the cell base material.

The vinylidene fluoride polymers of the present invention as described herein can also be used in lithium/oxyhalide cells as a bottom insulator. They may also be used in zinc bromide cells as a binder for bipolar electrodes or in nickel-metal hydride cells as a binder for the hydride electrode or for the nickel electrode.

The vinylidene fluoride polymers of the present invention are also suitable for use in a silver-zinc cell where the vinylidene fluoride polymers are used as a binder for the zinc electrode or in a lead-acid cell as a spacer between the electrodes and as a separator. The vinylidene fluoride polymers may also be used in thermal batteries for cathode active materials. In addition to nickel-metal hydride cells, the vinylidene fluoride polymers may also be used in other alkaline cells such as nickel-cadmium cells, and zinc-air cells, especially where a buffered electrolyte is employed to counteract the dehydrohalogenation effect of the alkali medium of these cells.

The following Examples further illustrate the best mode contemplated by the inventors for carrying out their invention and are to be construed as illustrative and not as in limitation thereof.

Melt viscosity measurements are by ASTM D3835 at 232° C. and 100 s$^{-1}$.

Thermal properties are measured with a Differential Scanning Calorimeter (DSC) according to ASTM D3418.

HFP Content was Determined by two Alternative Methods:

Method A:

HFP content was determined by $^{19}$F NMR according to the signal assignments and method described in Pianca et al., Polymer, vol. 28, 224–230 (February 1987). A Unity 400 spectrometer at 376.3 MHz was used. Spectra were obtained either in deuterated dimethyl formamide at 500 C with an excitation pulse width of 8.0 microseconds and a recycle delay of 10 seconds, in deuterated dimethyl sulfoxide at 80° C. with an excitation pulse width of 6.0 microseconds and recycle delay of 5 seconds, or in deuterated acetone at 50° C. with an excitation pulse width of 8.0 microseconds and a recycle delay of 20 seconds Method B HFP content was alternatively determined by $^{19}$F NMR using the following methods.

In preparation for the NMR analysis, VDF/HFP copolymer samples were dissolved in a 5 mm diameter NMR tube. Samples of less than 10 weight percent HFP were dissolved in DSMO-d6 at 80° C., while samples of more than 10 weight percent HFP were dissolved in acetone-d6 at 50° C. An amount of copolymer, 2 to 4 mg, was placed in a tube, and enough solvent was added to fill the tube to 5.5 cm (about 0.75 mL of solvent). A heating block was used to bring the samples to temperature. The samples were heated for at least one hour, until the solid was dissolved, and there was no gel present, but in the case of DMSO-d6, for a time no longer than 8 hours in order to avoid degradation. Tubes were inverted to check for gel.

Spectra were acquired on either a Bruker DMX or a Varian Mercury 300 spectrometer operated at 80° C. in the case of DMSO-d6 solvent or at 50° C. in the case of acetone-d6 solvent. Specific parameters for the instruments were as follows:

|  | Brucker DMX | Varian Mercury 300 |
|---|---|---|
| $^{19}$F signal frequency | 281.9 MHz | 282.3 MHz |
| pulse width | 45° at 2.5 us | ~30° at 2.5 us |
| recycle delay | 5 s | 5 s |
| linear prediction | not needed* | first 12 point are back predicted using 1024 points and 64 coefficients** |
| probe | 5 mm high temp H/F | 5 mm Nalorac zspec |
| $^1$H decoupling*** | yes | no |
| sweep width | 125 kHz | 100 kHz |
| acquisition time | 1.05 s | 0.3 s |

*No fluorine background observed on this instrument.
**This will be instrument dependent, depending on severity of background.
***This is inverse gated decoupling on the Bruker to improve resolution.

Spectra were analyzed according to the signal assignments described in Pianca et al., Polymer, vol. 28, 224–230 (February 1987). As a check on the accuracy of the NMR acquisitions, the integrals of the CF3's and the CF's were compared to see if they were in a ratio of 3 to 1.

A comparison of the HFP values found by Method A and Method B for the polymers of the following Examples is shown in Table B as follows:

TABLE B

Comparison of Values Found by Method A and Method B for the Polymers Listed in Table I below

| Example Number | HFP wt % by Method A | HFP wt % by Method B |
|---|---|---|
| 1 | 5.4 | 5.4 |
| 2 | 17.2 | 18.6 |
| 3 | 5.8 | 5.5 |
| 4 | 4.6 | 5.0 |
| 5 | 3.4 | 3.5 |
| 6 | 12.5 | 12.4 |
| 7 | 14.8 | 14.0 |
| 8 | 17.0 | 17.5 |
| 9 | 4.9 | 3.7 |
| 10 | 11.8 | 11.9 |
| 11 | 11.7 | 12.8 |
| 12 | 18.1 | 19.0 |

Weight-average molecular weights (Mw) and number-average molecular weights were measured by size exclusion chromatography (SEC). A Waters 150° C. chromatographic device with a set of PL gel 2 mixed B columns with bead size of 10 microns was used at an operating temperature of 105 degrees C. HPLC grade dimethyl sulfoxide (DMSO) was used as the eluent at flow rate of 1.0 mL/min. The samples were prepared by dissolution in DMSO for 5 hours at 100 degrees C., followed by filtration. The actual calculation method for molecular weights is illustrated in ASTM 5296-97.

EXAMPLE 1

Into a 7.5 liter, stainless steel reactor were charged 4.799 kg of deionized water, 0.230 kg of a 1 wt % solution of a mixture of perfluoroalkanoate salts, and 0.004 kg of paraffin wax. The mixture was purged with nitrogen and agitated for 30 minutes. The reactor was sealed and heated to 80 degrees Celsius. The reactor was charged with 0.355 kg of vinylidene fluoride, 0.049 kg of hexafluoropropylene (a weight ratio of 88 vinylidene fluoride/12 hexafluoropropylene), and 0.120 kg of a 5 wt % solution of ethyl acetate in deionized water. The reaction conditions were stabilized at 80 degrees Celsius and 4480 kPa, and then the polymerization was begun by introducing 0.026 kg of an initiator emulsion consisting of 2 wt % di-n-propyl peroxydicarbonate and 0.15 wt % mixed perfluoroalkanoate salts dispersed in deionized water. The pressure rose to 4550 kPa with the addition of the initiator emulsion. The polymerization was maintained by the addition of the initiator emulsion at the rate of 0.112 kg per hour, and by the addition of a mixture of vinylidene fluoride/hexafluoropropylene in the ratio 95 vinylidene fluoride/5 hexafluoropropylene so as to maintain pressure. After 4.2 hours, totals of 1.890 kg of vinylidene fluoride and 0.140 kg of hexafluoropropylene had been charged to the reactor. All feeds were stopped, and the reactor was cooled. After 5 minutes of cooling, agitation speed was reduced by 78% and surplus gases were vented. Agitation was stopped, the reactor was further cooled, and then it was emptied of latex. Polymer resin was isolated by coagulating the latex, washing the resulting solids with boiling water, and drying the solids at 110 degrees Celsius to yield fine powder. The resin so made had a melt viscosity of 2770 Pa.s, had a DSC melting point of 152 degrees Celsius, and had a hexafluoropropylene content as measured by NMR of 5.4 wt %.

EXAMPLE 2

Into a 7.5 liter, stainless steel reactor were charged 4.913 kg of deionized water, 0.230 kg of a 1 wt % solution of a mixture of perfluoroalkanoate salts, and 0.004 kg of paraffin wax. The mixture was purged with nitrogen and agitated for 30 minutes. The reactor was sealed and heated to 80 degrees Celsius. The reactor was charged with 0.415 kg of vinylidene fluoride, 0.215 kg of hexafluoropropylene (a ratio of 66 vinylidene fluoride/34 hexafluoropropylene), and 0.010 kg of ethyl acetate. The pressure was at 4895 kPa. The reaction conditions were stabilized at 80 degrees Celsius, and then the polymerization was begun by introducing 0.040 kg of an initiator emulsion consisting of 2 wt % di-n-propyl peroxydicarbonate and 0.15 wt % mixed perfluoroalkanoate salts dispersed in deionized water. The pressure dropped upon initiation and it was then maintained at 4825 kPa. The polymerization was maintained by the addition of the initiator emulsion at the rate of 0.176 kg per hour, and by the addition of a mixture of vinylidene fluoride/hexafluoropropylene in the ratio 84 vinylidene fluoride/16 hexafluoropropylene so as to maintain pressure. After 2.2 hours, totals of 1.585 kg of vinylidene fluoride and 0.445 kg of hexafluoropropylene had been charged to the reactor. Monomer feeds were stopped, and residual monomer was consumed by maintaining the initiator emulsion feed and 80 degrees Celsius for 20 minutes. The initiator feed and agitation were stopped and the reactor was allowed to settle 10 minutes. The reactor was cooled to 45 degrees Celsius, vented, and then it was emptied of latex. Polymer resin was isolated by coagulating the latex, washing the resulting solids with boiling water, and drying the solids at 80 degrees Celsius to yield fine powder. The resin so made had a melt viscosity of 1220 Pa.s, had a DSC melting point of 114 degrees Celsius, and had a hexafluoropropylene content as measured by NMR of 17.2 wt %.

EXAMPLE 3 (Comparative Example to Example 1)

Into a 7.5 liter, stainless steel reactor were charged 4.799 kg of deionized water, 0.230 kg of a 1 wt % solution of a mixture of perfluoroalkanoate salts, and 0.004 kg of paraffin wax. The mixture was purged with nitrogen and agitated for 30 minutes. The reactor was sealed and heated to 80 degrees Celsius. The reactor was charged with 0.400 kg of vinylidene fluoride, 0.030 kg of hexafluoropropylene (a weight ratio of 93 vinylidene fluoride/7 hexafluoropropylene), and 0.120 kg of a 5 wt. % solution of ethyl acetate in deionized water. The reaction conditions were stabilized at 80 degrees Celsius and 4480 kPa, and then the polymerization was begun by introducing 0.026 kg of an initiator emulsion consisting of 2 wt % di-n-propyl peroxydicarbonate and 0.15 wt % mixed perfluoroalkanoate salts dispersed in deionized water. The polymerization was maintained by the addition of the initiator emulsion at the rate of 0.112 kg per hour, and by the addition of a mixture of vinylidene fluoride/hexafluoropropylene in the ratio 93 vinylidene fluoride/7 hexafluoropropylene so as to maintain pressure. After 3.1 hours, totals of 1.890 kg of vinylidene fluoride and 0.140 kg of hexafluoropropylene had been charged to the reactor. Monomer feeds were stopped, and residual monomer was consumed by maintaining the initiator emulsion feed and 80 degrees Celsius for 20 minutes. The initiator feed and agitation were stopped, and the reactor was allowed to settle for 10 minutes. The reactor was cooled to 45 degrees Celsius, vented, and then it was emptied of latex. Polymer resin was isolated by coagulating the latex, washing the resulting solids with boiling water, and drying the solids at 110 degrees Celsius to yield fine powder. The resin so made had a melt viscosity of 2550 Pa.s, had a DSC melting point of 154 degrees Celsius, and had a hexafluoropropylene content as measured by NMR of 6.0 wt. %.

EXAMPLE 4

Into a 293 liter stainless steel reactor were charged 200.0 kg of deionized water, 1.00 kg of a 10 wt % solution of a mixture of perfluoroalkanoate salts, and 0.015 kg of paraffin oil. The reactor was evacuated and heated to a temperature of 91 degrees Celsius during the charging, and agitation was used. To the reactor were added 12.6 kg of vinylidene fluoride, 0.8 kg of hexafluoropropylene (a weight ratio of 94 vinylidene fluoride/6 hexafluoropropylene), and 0.5 kg of ethyl acetate, which brought the reactor pressure to 4480 kPa. During the pressurization, when the pressure reached 3445 kPa, a feed of initiator emulsion consisting of 2 wt % di-n-propyl peroxydicarbonate and 0.15 wt % mixed perfluoroalkanoate salts dispersed in deionized water was begun and was maintained at 9.0 kg/h until 4.6 kg of initiator emulsion had been added. The rate of further initiator emulsion addition was adjusted so as to maintain a total monomer feed rate of 27.0 kg/h. A monomer mixture in the ratio 94 vinylidene fluoride/6 hexafluoropropylene was fed to the reactor so as to maintain pressure at 4480 kPa until the totals of 85.3 kg of vinylidene fluoride and 5.4 kg of hexafluoropropylene had been charged to the reactor. All feeds were stopped, and residual monomer was consumed by maintaining 91° Celsius and agitation for 20 minutes and then by maintaining 91° C. for 35 minutes. The reactor was cooled, vented, and emptied of latex. Polymer resin was isolated by coagulating the latex, washing the resulting solids with water, and drying the solids to yield fine powder. The resin so made had a melt viscosity of 1740 Pa.s, had a DSC melting point of 155 degrees Celsius, and had a hexafluoropropylene content as measured by NMR of 4.7 wt. %.

EXAMPLES 5 TO 12

Copolymers of examples 5 to 8 are made similarly to copolymers of Examples 1 or 2, and copolymers of examples 9 to 12 are made similarly to copolymers of Examples 3 or 4 and are shown in Table I.

gelation times of 20 wt % solutions of the polymers in propylene carbonate (the propylene carbonate was of nomi-

TABLE I

EXPERIMENTAL EXAMPLES

| | Example | | | | | | | | | | | |
|---|---|---|---|---|---|---|---|---|---|---|---|---|
| | 1 | 2 | 5 | 6 | 7 | 8 | 3 | 4 | 9 | 10 | 11 | 12 |
| (Detailed example which the example is similar too) | — | — | 1 | 1 | 1 | 2 | — | — | 3 | 3 | 4 | 3 |
| Temperature, °C. | 80 | 80 | 80 | 80 | 80 | 80 | 80 | 91 | 80 | 80 | 91 | 80 |
| Pressure, kPa | 4550 | 4825 | 4550 | 4480 | 4480 | 4480 | 4480 | 4480 | 4480 | 4515 | 4480 | 4480 |
| Initial Fill [a] | | | | | | | | | | | | |
| Water, kg | 4.799 | 4.913 | 4.837 | 4.768 | 4.797 | 4.723 | 4.799 | 200.0 | 4.837 | 4.768 | 200.0 | 4.723 |
| VDF, kg | 0.355 | 0.415 | 0.365 | 0.365 | 0.460 | 0.400 | 0.400 | 12.6 | 0.390 | 0.365 | 11.0 | 0.455 |
| HFP, kg | 0.049 | 0.215 | 0.030 | 0.129 | 0.163 | 0.207 | 0.030 | 0.8 | 0.017 | 0.060 | 1.9 | 0.128 |
| EtoAc Solution, kg | 0.120 | 13 | 0.080 | 0.160 | 0.130 | 0.200 | 0.120 | — | 0.080 | 0.160 | — | 0.200 |
| EtoAc, kg | — | 0.010 | — | — | — | — | — | 0.5 | — | — | 0.7 | — |
| NPP Emulsion, kg | 0.026 | 0.040 | 0.026 | 0.033 | 0.036 | 0.040 | 0.026 | 4.6 | 0.026 | 0.033 | 3.7 | 0.040 |
| Totals | | | | | | | | | | | | |
| VDF, kg | 1.890 | 1.585 | 1.915 | 1.745 | 1.700 | 1.590 | 1.890 | 85.3 | 1.945 | 1.745 | 77.1 | 1.585 |
| HFP, kg | 0.140 | 0.445 | 0.083 | 0.285 | 0.331 | 0.441 | 0.140 | 5.4 | 0.085 | 0.285 | 13.6 | 0.445 |
| NPP Emulsion, kg | 0.506 | 0.460 | 0.413 | 0.422 | 0.352 | 0.463 | 0.405 | 8.5 | 0.540 | 0.491 | 8.3 | 0.563 |
| Melt Viscosity, Pa · s | 2770 | 1220 | 3120 | 1660 | 1760 | 480 | 2550 | 1740 | 2240 | 1010 | 660 | 850 |
| Melting Point, °C. | 152 | 114 | 156 | 132 | 125 | 116 | 154 | 155 | 159 | 141 | 139 | 126 |
| Polymer HFP, wt % (Method A) | 5.4 | 17.2 | 3.4 | 12.5 | 14.8 | 17.0 | 5.8 | 4.6 | 4.9 | 11.8 | 11.7 | 18.1 |

[a] Perfluoroalkanoate salt solution, perfluoroalkanoate salts, paraffin wax, and paraffin oil in examples 5 to 12 were the same as in the similar detailed examples.

Evaluation of the Solution Properties of the Examples

The term "solution(s) having improved clarity and fluidity" as used in the specification and claims of this application means as shown in Table II for Examples 2 and 12, that there will be a difference across a range of solvents between copolymers of the same HFP content at the same solution concentration and temperature whereby solutions of the copolymers of the present invention tend to remain clear and fluid for longer periods than solutions of copolymers made by a typical process described in the prior art.

The solution properties of examples 2 and 12 are shown in Table II. Mixtures of the indicated weight percent were prepared, using heat when necessary to dissolve the polymer completely and form a clear solution. Solutions were then allowed to cool and observed daily over a period of two weeks. The copolymer 2 showed a reduced tendency to gel and to be clearer than the copolymer 12. The retention of fluidity and clarity by the copolymer 2 is advantageous in applications which rely on polymer solutions, such as in the production of cast films and membranes.

The reduction in tendency toward gelation by the copolymers of the present invention is further shown in Table II A. The gelation times of propylene carbonate solutions of some of the examples are shown in the table. A Rheometrics® dynamic stress rheometer DSR-200 was used to measure the gelation times of 20 wt % solutions of the polymers in propylene carbonate (the propylene carbonate was of nominal 99.7% purity). The rheometer was fitted with a Peltier fixture and solvent trap. A 40 mm parallel plate geometry was used with a gap of 1 mm. Solid copolymer was mixed with propylene carbonate at room temperature on the day of measurement, the container was sealed, and the solution was formed by heating and stirring the mixture in the sealed container for 1.0 hour in a Pierce Reacti-Therm® Heating/Stirring Module set at 1200C. The solutions were quickly loaded at the end of the dissolution period into the test fixture, which was preset at 100° C. A temperature cooling ramp in dynamic oscillatory mode at 1 Hz was begun as soon as the fixture temperature re-equilibrated at 100° C.; re-equilibration typically required a minute or less. The cooling ramp was from 100° C. to 15° C. at a rate of 30° C./m. When 15° C. was reached, a 1 minute equilibration time was used, and then a time sweep measurement was begun. The sample was held at 15° C. during the time sweep measurement performed at 1 radian/s. The time sweep was continued until the gel point was reached. The gel point was taken as the point at which the solution storage modulus, G', and the loss modulus, G", became equal. The gel time was taken as the time duration in the time sweep to reach the gel point. Each line in Table IIA represents a separate sampling, dissolving, and gelation time determination. Thus, 10, 10, 10 in the table means that 3 samples of the product of Example 10 in Table I were taken, each sample was separately dissolved according to the description provided, and then each solution was separately tested for gelation time.

Figure 3:
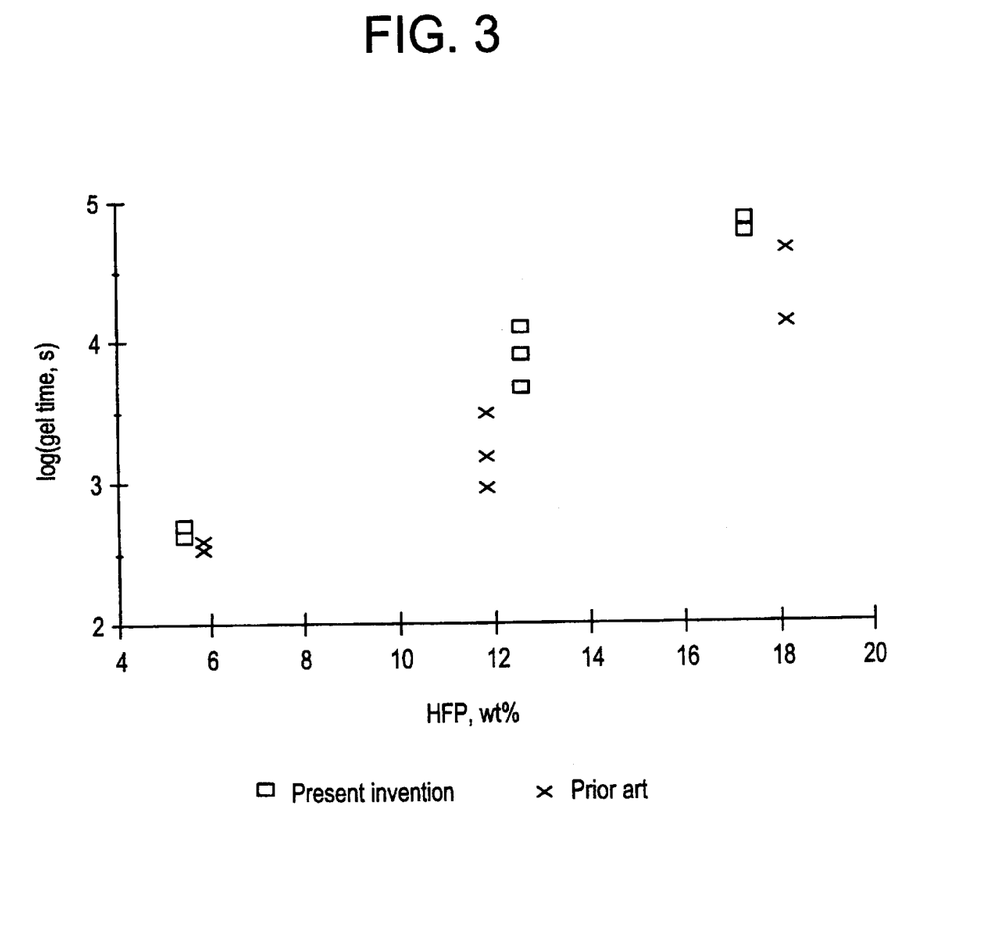
FIG. 3 shows the relationship between HFP content and log of gelation time from solution (20 wt % in propylene carbonate) of copolymers of the present invention and of copolymers of the prior art having sufficient synthesis detail for reproduction. The HFP levels were determined by method A described below.

The relation between HFP content and the logarithm of the gel time of the 20 wt % propylene carbonate solutions is shown in FIG. 3. It can be seen that the copolymers prepared according to the present invention have longer gelation times than the copolymers prepared according to the prior art synthesis over the whole range of HFP content. The reduced tendency toward gelation by the copolymers of the present invention is advantageous in processing such solutions for film casting and other solution applications. The ability to avoid gel formation provides a number of advantages in commercial use. -Longer shelf life of solutions is enabled and possible plugging of solution filtration equipment and build up of deposits in equipment are avoided as are changes in viscosity and nature of the resinous material applied to surfaces in the typical solution processes utilized to cast films on surfaces. The avoidance of gel particles in the film produced is also advantageous since-such gel particles adversely affect physical properties such as optical clarity.

TABLE II

SOLUTION PROPERTIES

| Polymer concentration and solvent [a] | Appearance Example 2 | Example 12 |
|---|---|---|
| 10% in MEK | fluid, clear | fluid clear |
| 20% in MEK | fluid, clear | by day 2, loose gel, clear |
| 30% in MEK | by day 14, some gel, clear | by day 1, loose gel, cloudy; by day 4, gel, cloudy |
| 10% in MPK | fluid, clear | fluid, clear |
| 20% in MPK | fluid, clear | by hour 2, some gel, clear; by day 1, gel, slightly cloudy |
| 10% in MiBK | fluid, clear | by day 4, gel, clear |
| 10% in CPO | fluid, clear | fluid, clear |
| 10% in CHO | fluid, clear | fluid, clear |
| 20% in CHO | by day 2, some gel, clear | by day 1, some gel, clear; by day 2, some gel, cloudy |
| 10% in EtoAC | fluid, clear | by day 7, some gel, clear |
| 20% in EtoAC | fluid, clear | by day 1, fluid, cloudy; by day 3, some gel, cloudy |
| 10% in n-PrOAc | fluid, clear | fluid, clear |
| 10% in i-PrOAc | fluid, clear | by day 6, some gel, clear |
| 10% in EGMEA | fluid, clear | by day 6, gel, clear |
| 10% in DMC | fluid, clear | by day 7, some gel, clear |
| 20% in DMC | fluid, clear | by day 1, some gel, cloudy; by day 2, mostly gel, cloudy |
| 20% in Blend 2 | fluid, clear | by day 14, fluid, cloudy |

Notes for Table II
[a] Polymer concentrations are Wt % unless stated otherwise. MEK is methyl ethyl ketone, MPK is methyl propyl ketone, MiBK is methyl isobutyl ketone, CPO is cyclopentanone, CHO is cyclohexanone, EtOAc is ethyl acetate, N-PrOAc is n-propyl acetate, i-PrOAc is isopropyl acetate, EGMEA is ethylene glycol monomethyl ether acetate, DMC is dimethyl carbonate, Blend 2 is composed of 35.4 parts MiBK, 29.8 parts CHO, and 30 parts DMC by weight.

TABLE II A

SOLUTION GELATION TIME [a]

| Example Number | Gelation Time |
|---|---|
| 1 | 425 |
| 1 | 512 |
| 3 | 342 |
| 3 | 394 |
| 6 | 4,913 |
| 6 | 8,322 |
| 6 | 12,924 |
| 10 | 934 |
| 10 | 1,553 |
| 10 | 3,191 |
| 2 | 77,000 |
| 2 | 62,400 |
| 12 | 14,100 |
| 12 | 47,500 |

[a] 20 wt % solutions at 15° C. in propylene carbonate. Gelation time is in seconds.

Evaluation of Film Gloss and Clarity

Some of the non-gelled solutions from the solution property tests were used to make films which were tested for gloss and clarity. The films were cast on a Leneta Form 2A opacity chart using a 0.127 meter draw down applicator having a 250 micrometer gap. The cast films were dried for three days at room temperature. Film gloss was determined using a HunterLab Progloss PG-2 gloss meter, and the results are shown in Table III. Film haze was measured by determining the whiteness index (CIELAB L* value) of the film on the black portion of the opacity chart using a HunterLab Labscan 2 calorimeter, and the results are shown in Table IV. Films from copolymer 2 showed higher gloss from a wider range of solvents than films from copolymer 12. The haze in films from 2 and 12 was generally similar, but noticeably less haze was observed in films from 2 in several instances. The results, taken together, show that VDF/HFP copolymer of the present invention demonstrates an increased utility for high-gloss, high-transparency film applications.

TABLE III

GLOSS OF CAST FILMS

| Polymer concentration and solvent [a] | Gloss, 20 degree/60 degree | |
|---|---|---|
| | Example 2 | Example 12 |
| 20% in MEK | 33.6/69.0 | 31.3/68.7 |
| 10% in MPK | 31.4/68.9 | 1.3/18.7 |
| 10% in CPO | 0.7/16.9 | 2.0/27.7 |
| 10% in EtOAc | 29.4/66.6 | 29.4/68.0 |
| 10% in n-PrOAc | 31.9/70.1 | 16.0/57.0 |
| 10% in i-PrOAc | 31.6/69.4 | 15.4/56.2 |
| 10% in DMC | 35.4/70.6 | 30.1/68.6 |
| 20% in Blend 2 | 34.6/71.2 | 0.1/2.4 |

Notes for Table III
[a] Polymer concentration and solvent indicates the wt % and solvent the films were cast from. MEK is methyl ethyl ketone, MPK is methyl propyl ketone, CPO is cyclopentanone, EtOAc is ethyl acetate, n-PrOAc is n-propyl acetate, i-PrOAc is isopropyl acetate, DMC is dimethyl carbonate, Blend 2 is composed of 35.4 parts methyl isobutyl ketone, 29.8 parts cyclohexanone, and 30 parts DMC by weight.

TABLE IV

CLARITY OF CAST FILMS

| Polymer concentration and solvent [a] | Clarity, CIELAB L* [b] | |
|---|---|---|
| | Example 2 | Example 12 |
| 20% in MEK | 6.59 | 6.22 |
| 10% in MPK | 6.19 | 14.48 |
| 10% in CPO | 15.18 | 15.56 |
| 10% in EtOAc | 7.38 | 5.84 |
| 10% in n-PrOAc | 5.64 | 7.34 |
| 10% in i-PrOAc | 5.61 | 7.79 |
| 10% in DMC | 6.21 | 5.73 |
| 20% in Blend 2 | 5.36 | 17.85 |

Notes for Table IV
[a] Polymer concentration and solvent indicates the wt % and solvent the films were cast from. MEK is methyl ethyl ketone, MPK is methyl propyl ketone, CPO is cyclopentanone, EtOAc is ethyl acetate, n-PrOAc is n-propyl acetate, i-PrOAc is isopropyl acetate, DMC is dimethyl carbonate, Blend 2 is composed of 35.4 parts methyl isobutyl ketone, 29.8 parts cyclohexanone, and 30 parts DMC by weight.
[b] Guide to haze:
L* < 7 no haze
7 < L* < 9 very slight haze
9 < L* < 11 slight haze
11 < L* < 15 moderate haze
15 < L* severe haze

Evaluation of the Thermal Properties of the Examples

Figure 1:
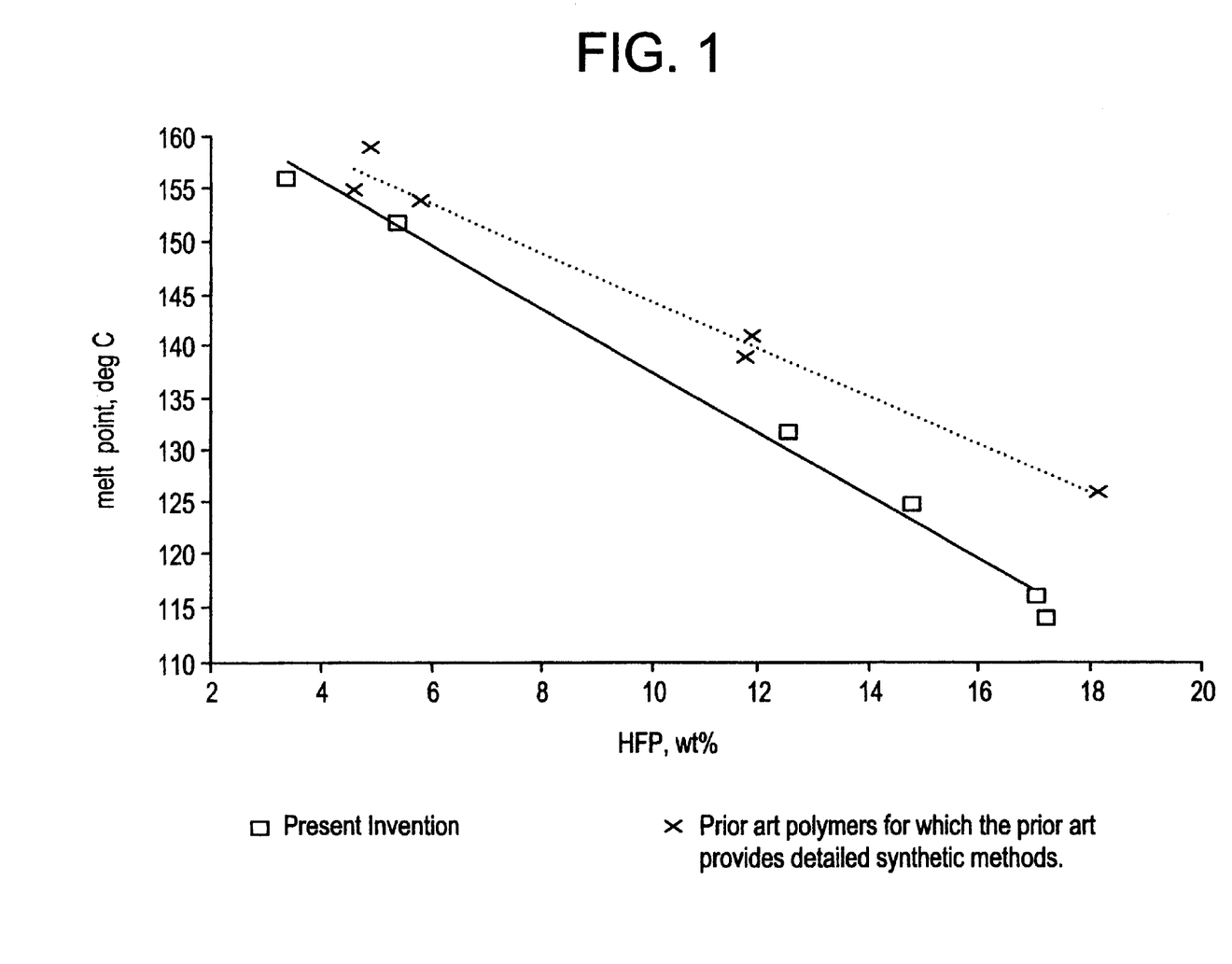
FIG. 1 is a comparison based on HFP content determined by method A described below of the final differential scanning colorimeter/(DSC) melting point of copolymers of the invention with DSC melting points of prior art compounds whose synthesis is described in detail as they vary by HFP content.
Figure 5:
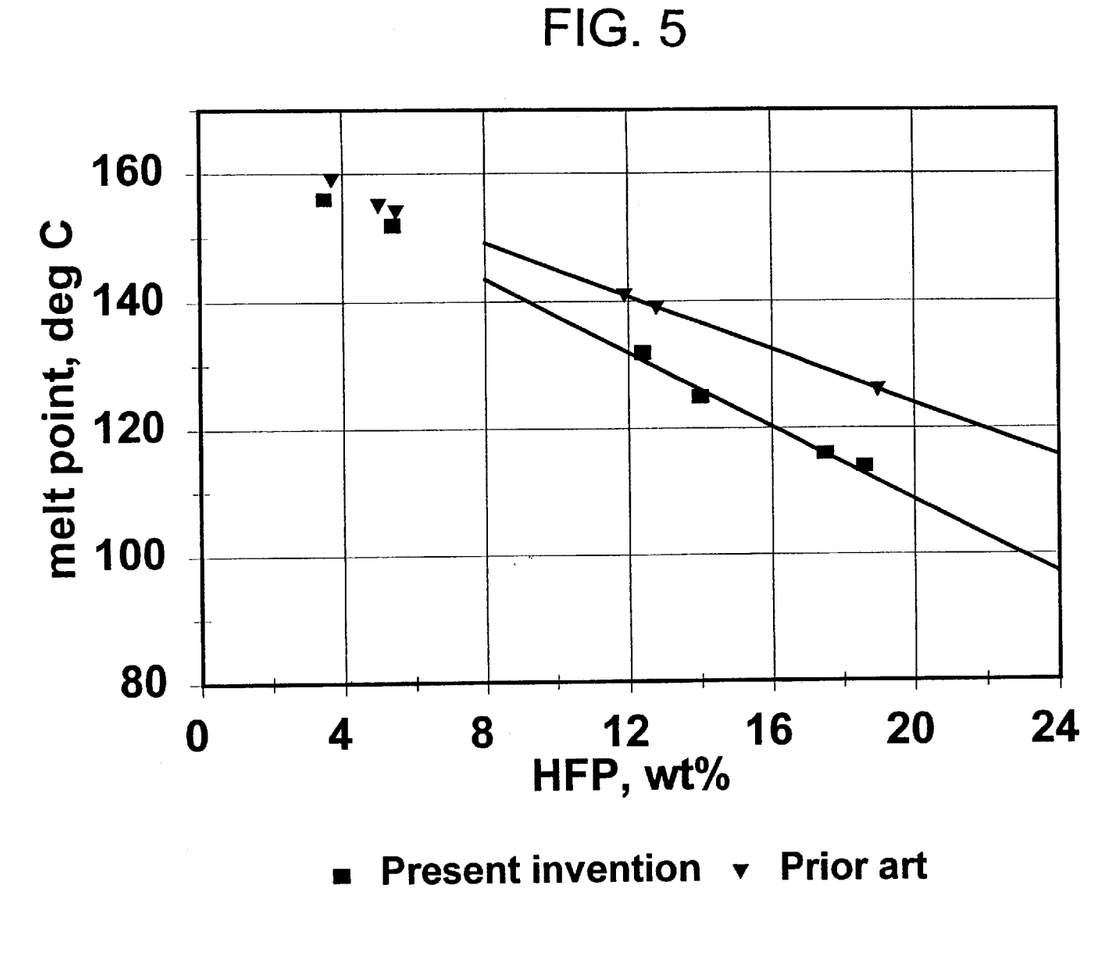
FIG. 5 shows final melting points by DSC of copolymers of the present invention and of copolymers of the prior art whose synthesis is described in detail as they vary by HFP content. The curve fits are linear first order curve fits. The HFP levels were defined by method B described below.

The final melting point is an important parameter in the use and processing of semicrystalline polymers. It is known that the final melting point of VDF/HFP copolymers is related to the HFP content in the copolymers. The relation between HFP content as determined by Method A, and final melting point of the VDF/HFP copolymer examples is shown in FIG. 1. The linear first order curve fit relationship between HFP content and final melting point of the VDF/HFP copolymers examples is shown in FIG. 5. Illustrated in FIG. 5 are the portions of the curves lying in the 8 to 24 weight percent HFP ranges as determined by Method B. The copolymers of the present invention and the copolymers prepared according to the prior art synthesis which details are available can be seen to fall on different melting point curves, indicating that they are different materials, with the prior art copolymers having a higher melting point at a given HFP content. The lower curve of FIG. 5 depicts the relation between DSC melting point and weight percent HFP content which forms the upper boundary limit for the copolymers contemplated by this invention over the 8 to 24 HFP weight % content range as determined by Method B. Thus, the DSC melting points of the copolymers of the present invention fall on or below the value limit established by this lower curve. The lower melting point property of the copolymers of the present invention can allow lower processing temperatures than for the prior art synthesis copolymers.

Evaluation of Extractables in Dimethyl Carbonate General Procedure 1 g of polymer and 9 g of dimethyl carbonate were placed in a closed 25 ml container. The contents of the container were continually agitated by appropriate means while maintaining the desired temperature by appropriate means for 24 hours. The entire contents of the container were then transferred to a centrifuge tube and centrifuged to separate undissolved polymer. The liquid phase was transferred to a suitable tared container and the solvent evaporated. The residue in the container was weighed and reported as percent by weight extractables.

The amount of polymer extracted into dimethyl carbonate at 40° C. was measured. The data is shown in Table V. The HFP content was determined by Method A. Copolymers prepared according to synthetic methods in the prior art for which details are available are labeled "N". Copolymers prepared according to the methods described for the present invention are labeled "U".

TABLE V

Effect of HFP Content, Molecular Number and Uniformity of Compositional Distribution on Polymer Dissolution in DMC

| Sample Lot # | HFP (mole %) | Mw | Mn | Extractable (40° C.) DMC | Composition |
|---|---|---|---|---|---|
| K2801 | 4.5 | 460000 | 145000 | 12.0% | N |
| K2801 | 4.5 | 495000 | 157000 | 10.5% | N |
| 9521 | 2.1 | 427000 | 167000 | 3.11% | N |
| 9527 | 3.6 | 473000 | 150000 | 14.30% | N |
| 9529 | 2.8 | 417000 | 148000 | 9.29% | N |
| 88 | 3.6 | 375000 | 138000 | 4.04% | U |
| 90 | 2.3 | 483000 | 188000 | 0.23% | U |
| 94 | 2.4 | 676000 | 240000 | 0.41% | U |
| 96 (Ex1) | 2.4 | 409000 | 159000 | 0.28% | U |
| 98 | 2.4 | 351000 | 144000 | 1.11% | U |
| 100 (Ex5) | 1.5 | 523000 | 194000 | 0.41% | U |
| 104 | 3.1 | 433000 | 157000 | 1.61% | U |

Figure 2:
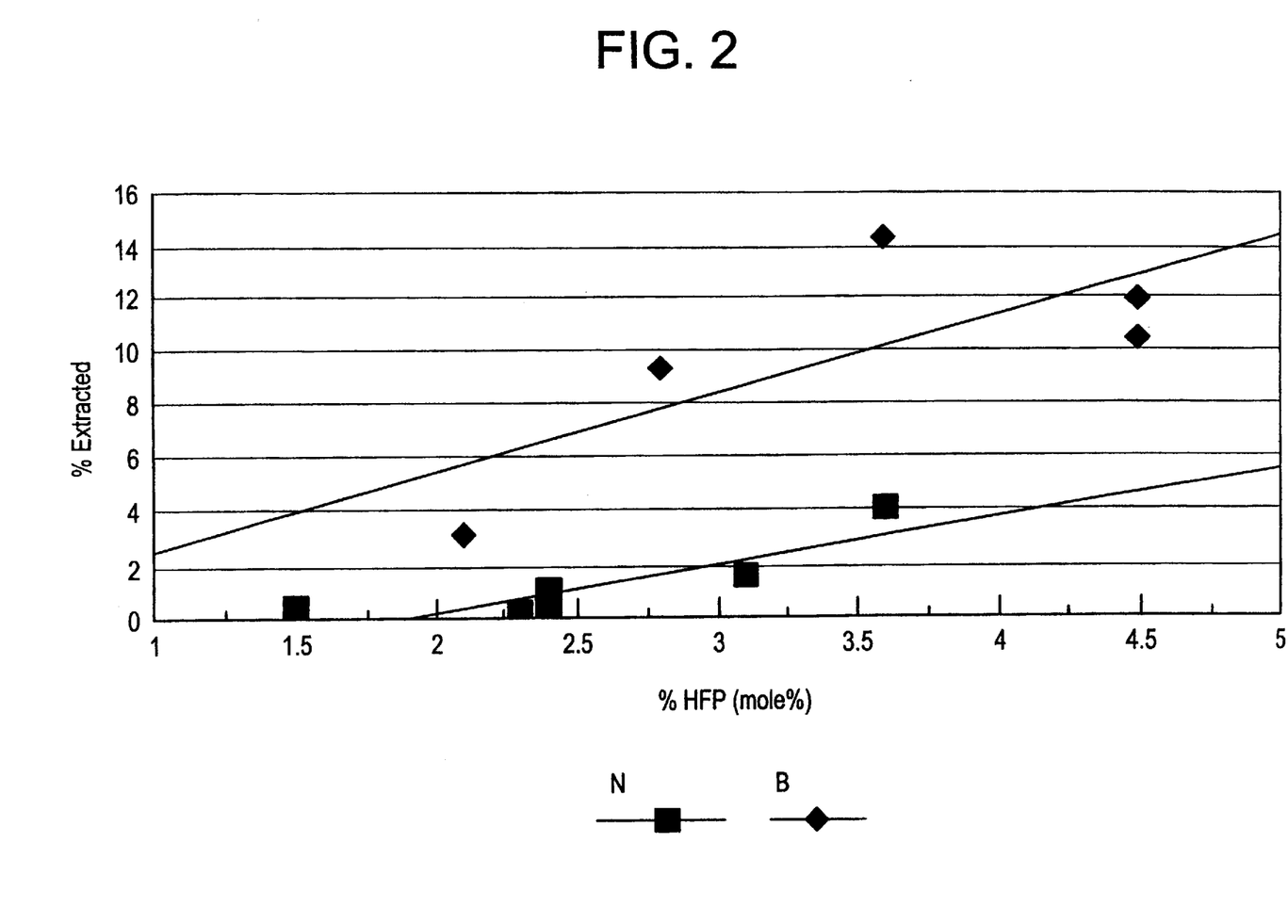
FIG. 2 shows the effect of HFP level on polymer extractibles in dimethyl carbonate (DMC) at 40° C. for copolymers of the invention and copolymers of the prior art whose synthesis is described in detail. The HFP levels were determined by method A described below.

A cursory examination shows that all N samples have higher levels of polymer extracted into dimethyl carbonate. FIG. 2 shows a plot of the extractables as a function of HFP content (mole %). In FIG. 2 the symbol N signifies the Narrow composition (which means the same thing as uniform composition) of the present invention, while B signifies the Broad composition (which means the same thing as nonuniform composition) of the prior art. Two distinct curves are outlined for the two classes of materials. The upper curve (B samples) shows significantly higher levels of extractables for a given level of HFP compared to the N curve. Measured slopes for these curves are 3% extractables/mole % HFP for the B polymers and 1.7% extractables/mole % HFP for the N polymers.

The observed and calculated % extractables under both the single and dual functional model, using Method A for HFP content, are shown for the N polymers in Table VI and for the U polymers in Table VII.

TABLE VI

Comparison of Wt. % Extractables of N polymer as a function of HFP content or HFP content and Mn

| % Extractable (meas) | % Extractable (calc model 1) | % Extractable (calc model 2) |
|---|---|---|
| 12.0% | 12.6% | 13.4% |
| 10.5% | 12.6% | 10.1% |
| 3.11% | 5.7% | 3.2% |
| 14.30% | 10.0% | 10.5% |
| 9.29% | 7.7% | 9.7% |

(Model 1) % Extractable = 2.9 (HFP mole %) − 0.4
(Model 2) % Extractable = 46.4 + 1.7 (HFP mole %) − 0.00028 (Mn)

TABLE VII

Comparison of Wt. % Extractables of U polymer as a function of HFP content of HFP content of Mn

| % Extractable (meas) | % Extractable (calc model 1) | % Extractable (cacl model 2) |
|---|---|---|
| 4.04% | 2.9% | 3.1% |
| 0.23% | 0.71% | 0.75% |
| 0.41% | 0.88% | 0.48% |
| 0.28% | 0.88% | 1.1% |
| 1.11% | 0.88% | 1.2% |
| 0.41% | −0.65% | −0.50% |
| 1.61% | 2.1% | 2.2% |

(Model 1) % Extractable = 1.7 (HFP mole %) − 3.2
(Model 2) % Extractable = −1.2 + 1.5 (HFP mole %) − 8 × $10^{-6}$ (Mn)

In the specification and the attached claims, the expression "having weight percent extractables within 1.5% of the percent by weight extractables calculated by an equation selected from the group consisting of:
a) Wt % Extractable=1.7(HFP mole %)−3.2, and
b) Wt % Extractable=−1.2+1.5(HFP mole %)−8×$10^{-6}$(Mn)
means that the-measured value of percent extractables in dimethylcarbonate at 40° C. must be within 1.5 absolute percentage points from the extractable value calculated for the particular polymer by either equation.

That is, if the calculated value of % extractables by either equation 1 or 2 is 3.0 and the observed value is between 1.5 and 4.5% it falls within the intended coverage value. Similarly if the observed value is 8.0% it will be within the intended coverage if the calculated value from either equation ranges from 6.5% to 9.5%.

In the above described procedure for determining extractables in dimethyl carbonate, centrifugation for thirty minutes at 1500 rpm at ambient temperature was employed to separate the solution from the insoluble matter and drying at 50 deg. C for 70 hours under mechanical pump vacuum was used to determine the weight of solids in the separated solution.

EXAMPLE 13

Polyvinylidene Fluoride/Chlorotrifluorethylene Copolymer having Substantially Homogeneous Monomer Distribution Following a procedure analogous to that of Example 1 provide an initial charge containing 0.40 kg of vinylidene fluoride and 0.0124 kg of chlorotrifluorethylene (97 VDF/3 CTFE) and maintain the reaction by a continuous feed of 96 VDF to 4 CTFE together with initiator emulsion for a total feed convenient for the reactor size of about 1.9525 kg of VDF and 0.0775 kg CTFE to obtain the title copolymer having about 4.0 wt. % CTFE content.

EXAMPLE 14

Comparison of the Ionic Conductivity of VDF/HFP Copolymer Prepared as in Example 1 with Typical VDF/HFP Copolymer Synthesized According to the Prior Art Polymer A is a VDF/HFP copolymer having 6 weight % HFP prepared by a method analogous to that described in Example 1.

Polymer B is a commercially available, VDF/HFP copolymer having 10 weight % HFP (KYNAR® Flex 2801 from Elf Atochem North America, Inc. now Atofina Chemicals, Inc.).

A 75 micron thick film is cast from a solution of Polymer A or Polymer B/silica/dibutylphthalate (DBP) in acetone (30/20/50 parts by weight). The DBP is then extracted from the film using di-n-butyl ether. The cast and extracted film is then dried and introduced into a glove box and impregnated with the electrolyte solution 1 M $LiPF_6$ in 50:50 wt:wt ethylene carbonate:propylene carbonate. The impregnated membrane is then enclosed in a button cell by sandwiching the membrane between stainless steel blocking electrodes then placing that assembly into button "tabs" and sealing (by crimping). The cell resistance is measured using an Impedance Analyzer.

The impedance is measured using a 0.1 V amplitude and a frequency range of 13 MHZ to 5 Hz. The data obtained is then plotted in a Nyquist plot $[-I_m(Z)$ vs. $R_e(Z)]$ Conductivity is then calculated from the plot.

For Polymer A, conductivity was found to be 2.4 mS/cm and for Polymer B, conductivity was 1.4 mS/cm.

This confirms that batteries made using the VDF polymers of the first composition aspect of the invention exhibit higher conductivity, enabling higher discharge rates than batteries made from known prior art VDF polymers.

The subject matter which applicants regard as their invention is particularly pointed out and distinctly claimed as follows:

1. An improved electrochemical cell having a positive electrode, an absorber-separator and a negative electrode wherein at least either one of the electrodes comprises a vinylidene fluoride polymer having an electrolyte material combined therewith and/or said absorber-separator comprises a vinylidene fluoride polymer having an electrolyte material combined therewith wherein the improvement comprises the vinylidene fluoride polymer consisting essentially of a copolymer of vinylidene fluoride and hexafluoropropylene containing a maximum of about 24 weight percent hexafluoropropylene, having a uniform distribution of hexafluoropropylene residues between chains; wherein the copolymer containing up to 8 weight percent nominal hexafluoropropylene content has weight percent extractables within plus or minus 1.5% of the percent by weight extractables calculated by an equation selected from the group consisting of:

Wt. % Extractables=1.7(HFP mole %)−3.2, and

Wt. % Extractables=−1.2+1.5(HFP mole %)−8×$10^{-6}$(Mn) when HFP mole % is calculated by Method A where Mn is number-average molecular weight;

and wherein the copolymer containing 8 weight percent or greater nominal hexafluoropropylene content has a DSC melting point equal to or less than that defined by the equation:

DSC melting point °C.=166.7−2.9(HFP wt %) when the HFP wt % is determined by Method B.

2. An improved electrochemical cell as defined in claim 1 wherein the copolymer of vinylidene fluoride and hexafluoropropylene provides solutions of improved clarity and fluidity.

3. An improved electrochemical cell as defined in claim 1 wherein the copolymer of vinylidene fluoride and hexafluoropropylene has greater than 8% by weight HFP content.

4. An improved electrochemical cell as defined in claim 1 wherein the copolymer of vinylidene fluoride and hexafluoropropylene has from about 2 up to 8 weight percent hexafluoropropylene content.

5. An improved electrochemical cell as defined in claim 1 wherein the copolymer of vinylidene fluoride and hexafluoropropylene has from about 3 to about 7 wt % hexafluoropropylene content.

6. An improved electrochemical cell as defined in claim 1 wherein the copolymer of vinylidene fluoride and hexafluoropropylene has from about 3 to about 6 weight percent hexafluoropropylene content.

7. An improved electrochemical cell as defined in claim 1 wherein the copolymer of vinylidene fluoride and hexafluoropropylene is made by a process of comprising:

(a) charging to a reactor: vinylidene fluoride and hexafluoropropylene in a first effective ratio, water, a water soluble surfactant capable of emulsifying both the initiator and the reaction mass during polymerization and an initiator to start polymerization;

(b) feeding additional vinylidene fluoride and hexafluoropropylene in a second effective ratio to maintain reaction pressure until the desired reactor fill is obtained; and (c) obtaining vinylidene fluoride-hexafluoropropylene copolymer.

* * * * *